United States Patent [19]

Morton, Jr.

[11] Patent Number: 5,050,004
[45] Date of Patent: Sep. 17, 1991

[54] FACSIMILE MACHINE TRANSMISSION RATE FALL-BACK ARRANGEMENT

[75] Inventor: Alfred C. Morton, Jr., Oceanport, N.J.

[73] Assignee: AT&T Bell Laboratories, Murray Hill, N.J.

[21] Appl. No.: 457,070

[22] Filed: Dec. 26, 1989

[51] Int. Cl.$^5$ ............................................. H04N 1/00
[52] U.S. Cl. ................................... 358/405; 358/406; 358/434
[58] Field of Search ............... 358/405, 406, 434, 435, 358/437, 439, 445, 466, 486; 371/5.1, 5.5, 32, 33

[56] References Cited

U.S. PATENT DOCUMENTS 4,153,916  5/1979  Miwa et al. ........................ 358/406
4,623,936  11/1986 Urban et al. ....................... 358/284

FOREIGN PATENT DOCUMENTS 60-58772  4/1985  Japan ................................ 358/405
62-6087   3/1987  Japan .

OTHER PUBLICATIONS

IEEE Trans. on Communications, vol. COM-25, No. 10, Oct. 1977, "Facsimile Signal Decoding Which Localizes the Effect of Run—Length Code Errors", Y. Eto, et al, pp. 1170–1173.

IEEE Trans. on Communications, vol. COM-25, No. 11, Nov. 1977 "Comparison of Redundancy Reducing Codes for Facsimile Transmission of Documents", H. G. Musmann et al, pp. 1425–1433.

Primary Examiner—Joseph A. Orsino
Assistant Examiner—Thomas D. Lee
Attorney, Agent, or Firm—Frederick B. Luludis

[57] ABSTRACT

A facsimile machine is provided with a fall-back strategy arranged to track not only errors occurring in received scan lines randomly disposed over a received facsimile page, but also errors occurring in each of a series of scan lines. If the level of each such error at least equals the value of a respective threshold adapted to the current transmission rate and facsimile resolution, then the transmission rate is changed, in which case, the value of each threshold is changed in accordance with a new transmission rate.

11 Claims, 5 Drawing Sheets

TABLE 1
THRESHOLD VALUES - STANDARD RESOLUTION

| TRANSMISSION SPEED | TH 0 | TH 1 | TH 2 |
|---|---|---|---|
| 9600 | 20 | 2 | 0 |
| 7200 | 20 | 3 | 1 |
| 4800 | 40 | 6 | 2 |
| 2400 | 80 | 12 | 4 |

TABLE 2
THRESHOLD VALUES - FINE RESOLUTION

| TRANSMISSION SPEED | TH 0 | TH 1 | TH 2 |
|---|---|---|---|
| 9600 | 40 | 20 | 2 |
| 7200 | 40 | 20 | 3 |
| 4800 | 80 | 40 | 6 |
| 2400 | 160 | 80 | 12 |

TABLE 1
THRESHOLD VALUES - STANDARD RESOLUTION

| TRANSMISSION SPEED | TH 0 | TH 1 | TH 2 |
|---|---|---|---|
| 9600 | 20 | 2 | 0 |
| 7200 | 20 | 3 | 1 |
| 4800 | 40 | 6 | 2 |
| 2400 | 80 | 12 | 4 |

TABLE 2
THRESHOLD VALUES - FINE RESOLUTION

| TRANSMISSION SPEED | TH 0 | TH 1 | TH 2 |
|---|---|---|---|
| 9600 | 40 | 20 | 2 |
| 7200 | 40 | 20 | 3 |
| 4800 | 80 | 40 | 6 |
| 2400 | 160 | 80 | 12 |

FACSIMILE MACHINE TRANSMISSION RATE FALL-BACK ARRANGEMENT

TECHNICAL FIELD

The invention relates to facsimile machines and more particularly relates to a transmission rate fall-back strategy that is invoked when the quality of a received page is found to be unacceptable.

BACKGROUND OF THE INVENTION

Facsimile machines employ a so-called fall-back strategy to reduce the speed of their associated modems whenever they encounter transmission impairments which degrade the page quality of received information (i.e. a facsimile page containing printed information, such as text and/or an image). Typically, the fall-back strategy is based solely on counting the number of scan lines on a page that contain errors due to, for example, transmission noise occurring on the associated communication facility. Thus, if the number of scan line errors on a received page happens to exceed a predetermined value—illustratively a value of 20—, then the receiving machine classifies the received page as being unacceptable. As a result thereof, the receiving and sending machines may renegotiate with one another to reduce the transmission rate as a way of hopefully improving the quality of succeeding pages. For example, if two facsimile machines are communicating with one another at a transmission rate of 9600 bps, they may elect to fall back to 7200 bps in the event that a received facsimile page is found to be unacceptable. Moreover, the machines may thereafter fall back to 4800 bps if the quality of the next received page is also found to be unacceptable as a result of the number of scan line errors exceeding the predetermined threshold.

I have recognized that as a result of using the same threshold for each transmission rate, prior facsimile machines are more apt to continue at the current rate of transmission, despite the fact that they have received pages with unacceptable quality. This is because many prior facsimile machines employ threshold values that are overly permissive of scan line errors in some applications. Consequently, the transmission speed may not be reduced in cases where the communication facility quality is inadequate for the current speed. Subsequent received pages in this case may also have unacceptable quality, where use of a lower speed may have produced satisfactory pages. Furthermore, when the same threshold is used for each transmission rate but the threshold values are overly critical of scan line errors, the facsimile machines are more apt to fall-back in speed once they have done so during a given facsimile transmission. In this case, the transmission rate may rapidly decrease to, for example, 2400 bps, thereby causing the duration, and hence, the cost of facsimile transmission to increase.

I have also recognized that such prior facsimile machines treat all scan line errors the same. That is, they do not distinguish between errors occurring in scan lines randomly disposed on a facsimile page and errors occurring in each of a series of contiguous lines. As a result, prior facsimiles machine are likely to conclude that the quality of a received page is acceptable even though the page may contain one or more of such series. However, in such an instance, the user of such machines may reach an opposite conclusion.

SUMMARY OF THE INVENTION

A facsimile machine is provided with a fall-back strategy arranged to track not only errors occurring in received scan lines randomly disposed over a received facsimile page, but also errors occurring in each of a series of contiguous scan lines. In addition, if, upon receipt of the final scan line of a facsimile page, it is found that the level of at least one such error at least equals the value of its respective threshold adapted to the current transmission rate and facsimile resolution, then the transmission rate is changed, in which case, the value of each of the threshold is also changed in accordance with the new transmission rate.

DETAILED DESCRIPTION

Figure 1:
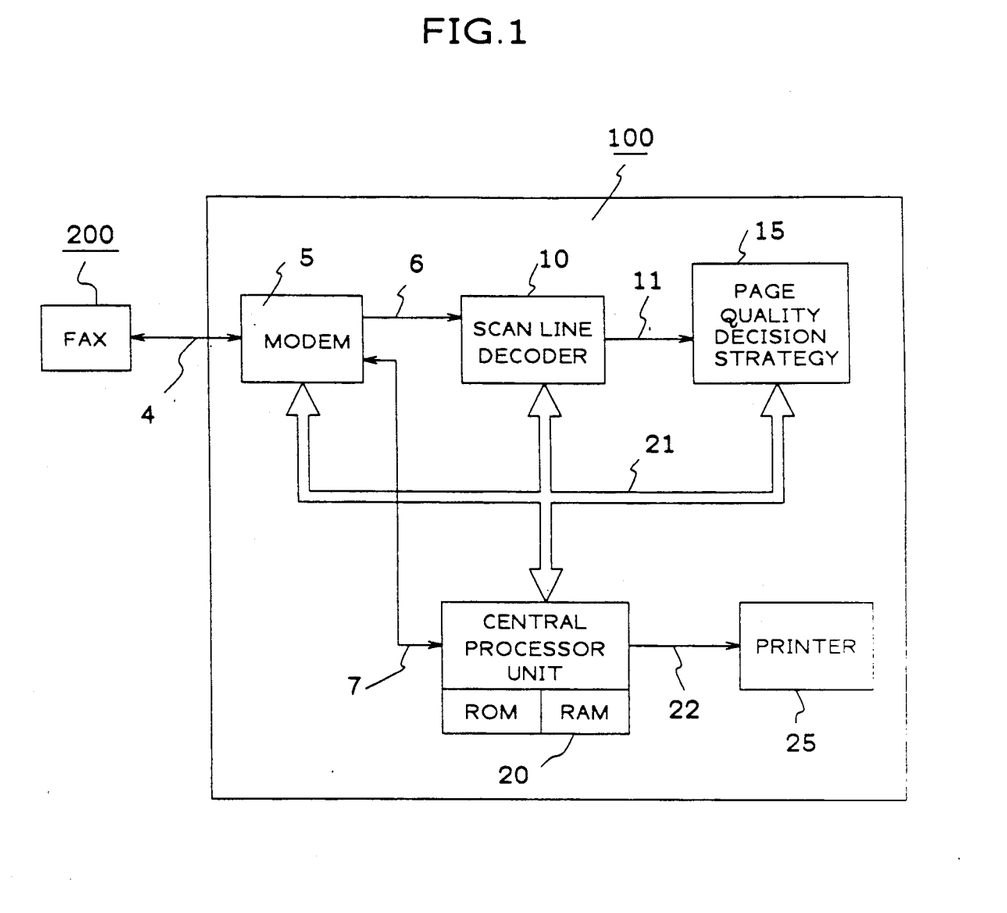
FIG. 1 shows a block diagram of two facsimile machines in communication with one another in which one of the machines is shown in more detail than the other to illustrate the principles of the invention.

Turning now to FIG. 1, there is shown a broad block diagram of facsimile machine 100 in communication with facsimile machine (FAX) 200 via communication path 4. Communication path 4 may be, for example, a dedicated transmission channel or a so-called telephone dial-up line. The manner in which a connection between facsimile machines is established is well-known and will not be discussed herein. However, it suffices to say that once transmitting and receiving facsimile machines are connected to one another, they then exchange various codes as well as phasing and training signals to establish a mutually acceptable operating mode including the transmission rate that they will use for the sending and receiving of data.

In addition, a facsimile machine e.g., machine 200, typically includes a scanner arranged to scan a page of information line by line and to convert the printed information and blank portions of the page into respective picture elements. Machine 200 then forms the picture elements (pixels) into respective sequences, and encodes each such sequence into an associated code word using a predetermined compression technique, such as, for example, the well-known run length coding method of encoding a bit stream. As each code word is created, it is then modulated using a conventional modulation/demodulation technique. The result is then presented to the respective communications path, or channel, for transmission to the receiving facsimile machine. e.g., machine 100, connected to the other end of the path.

The receiving facsimile machine, on the other hand, demodulates each signal that it receives and organizes the resulting bit stream into a frame of code words representing a single scan line. In facsimile transmission, the end points of a scan line are marked by respective end-of-line (EOL) code words (signals), which thus form the boundary of the frame. The receiving machine then interprets each of the code words forming a frame to determine the lengths of the respective strings of pixels, and, thus determine the respective black and white segments of the received scan line. Machine 100 then presents the scan line to a printer for printing a hard copy of the information represented by the pixels.

Since facsimile machines typically perform common functions, a discussion of machine 100 will equally pertain to machine 200. It is assumed herein that machine 100 is the receiving machine and that machine 200 is the transmitting facsimile machine. In particular, at the heart of facsimile machine 100 is central processing unit (CPU) 20, which controls the overall operation of machine 100 in accordance with software programs that are stored in read only memory (ROM) contained in CPU 20. The ROM is also used for storing particular application programs which control the operation of other circuits contained in machine 100, such as printer 25 and modem 5. CPU 20 also contains random access memory (RAM) for storing, inter alia, various information that CPU 20 receives via bus 21 from the other circuits forming machine 100, such information being, for example, a decoded scan line of pixels.

As seen in the FIG., machine 100 communicates with path 4 via conventional modem 5. That is, modem 5 is arranged in a conventional manner to modulate data words presented to its input via bus 7 and present the result to communication path 4 for transmission to machine 200. Modem 5 is also arranged to demodulate signals representing respective code words that are received via path 4 and present the result to scan line decoder via bus 6. Modem 5 performs such modulation and demodulation in accordance with a well-known technique, such as, for example, the technique commonly referred to as quadrature amplitude modulation.

Scan line decoder 10 responsive to receipt of a code word decompresses the code word into a respective sequence of pixels using a conventional compression/-decompression algorithm, such as, for example, the aforementioned run-length coding method. Decoder 10 stores each such sequence in internal memory (not shown) and continues in this manner until it receives a code word defining the aforementioned EOL.

In addition, decoder 10 implements an error checking arrangement to determine if a received code word, and thus a scan line, contains an error. As is well-known, a scan line comprises 1728 pixels for both standard and fine resolutions. Thus, decoder 10 totals the number of pixels making up a scan line to determine if the scan line contains an error. If the scan line contains the proper number of pixels, then the scan line is supplied to CPU 20 via bus 21. CPU 20, in turn, presents the scan line of pixels to bus 22 for delivery to printer 25 for printing.

However, if a scan line is found to contain an error, then decoder 10 (a) prevents the scan line from being printed by erasing the line from its internal memory and (b) sends to error tracking circuit 15 via a respective lead of multilead bus 11 a signal indicative of that fact. It is noted that there are a number of other ways of dealing with a scan line that contains an error. For example, a facsimile machine may be arranged to either (a) print the scan line even though it contains an error, (b) reprint the last previous scan line which does not contain an error, or (c) print a so-called "white" line in place of the corrupted scan line.

Figure 2:
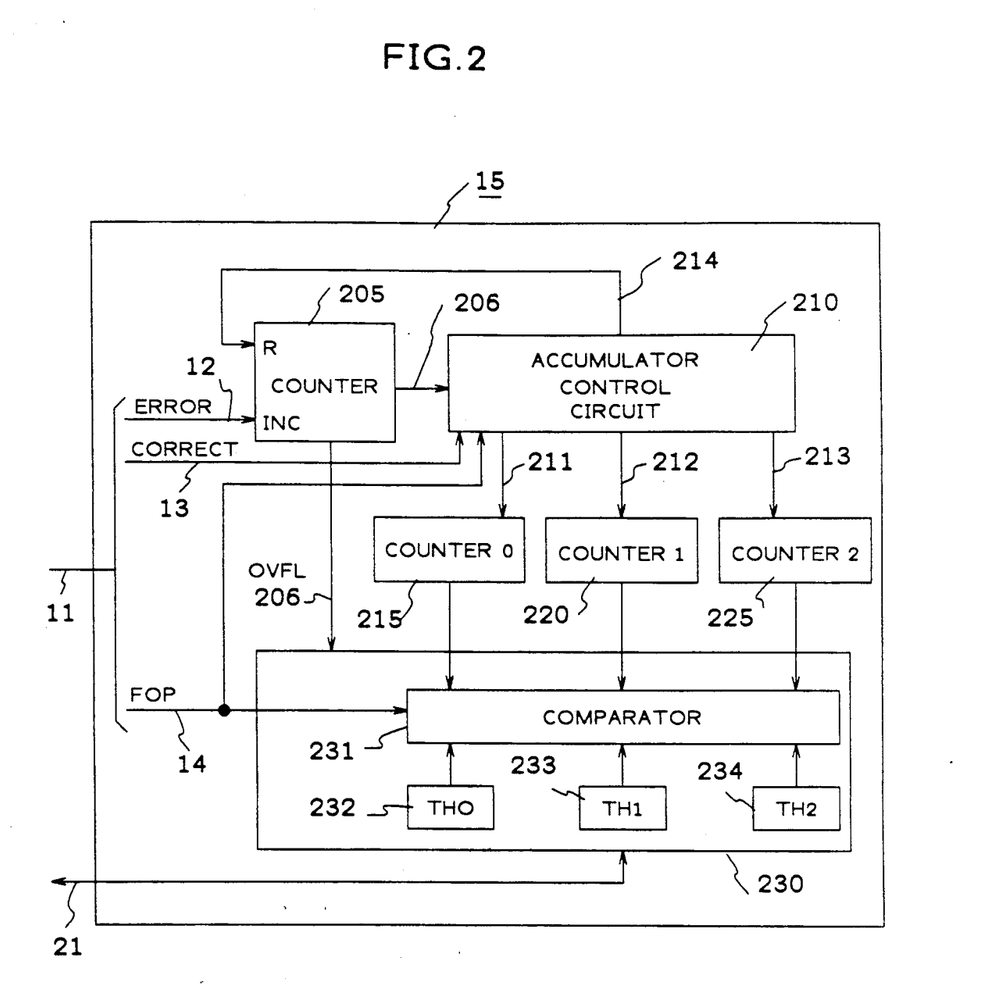
FIG. 2 is an illustrative functional block diagram of the circuitry which implements the invention in the machines of FIG. 1.

Continuing, error tracking circuit 15, which may be readily implemented using a microprocessor and associated memory, both RAM and ROM, counts the number of signals that it receives from decoder 10 as a way of tracking the number of scans lines that contain an error. An expanded functional block diagram of error tracking circuit 15 is shown in FIG. 2.

Specifically, multilead bus 11 comprises at least leads 12, 13 and 14. Decoder 10 supplies to lead 13 a signal each time a scan line is found to be correct and supplies to lead 12 a signal each time a scan line is found to be incorrect, i.e., contains an error. Similarly, decoder 10 supplies to lead 14 a signal upon receipt of a code word defining the end of a transmitted page (EOP).

It is seen from the FIG. that lead 12 connects to the INC (increment) port of multi-stage counter 205. Accordingly, a signal appearing on lead 12 causes counter 205 to be incremented by a predetermined value—illustratively one. It is also seen from the FIG. that the contents of counter 205 is presented to accumulator control circuit 210 via bus 206. However, control circuit 210 does not respond thereto until it receives a signal via lead 13 indicating that the current scan is correct. When it receives that signal, then control circuit 210 increments one of the counters 215, 220 or 225 by a predetermined value—illustratively one. That is, control circuit 210 increments (a) counter 215 if the value received via bus 206 is equal to one, indicating that the scan line received just prior to receipt of the current correct scan line was in error; (b) counter 220 if the received value is equal to either two or three, indicating that two or three contiguous scan lines received just prior the current correct scan line were in error or (c) counter 225 if the received value is equal to at least four, indicating that at least four contiguous scan lines received just prior to the current correct scan line were in error. When circuit 15 increments one of the counters 215, 220 or 225, it then clears counter 205 via reset lead 214, thereby preparing counter 205 to track the number of succeeding scan lines which may contain errors.

Thus, my arrangement, in accordance with an aspect of the invention, tracks the number of random scan lines that contain an error and the number of contiguous scan lines that contain errors. Moreover, in accordance with an aspect of the invention, my arrangement treats the latter number as two different series (groups) of errors based on whether the contents of counter 205 indicates that either 2–3 contiguous scan lines (representing a first group) or at least 4 contiguous scan lines (representing a second group) contain errors. The underpinnings for such treatment is supported by recognizing that the quality of a received facsimile page may be acceptable to a user even though the page contains an appreciable number of random scan lines contain errors. However, the same page would not be acceptable to the user even though it did not contain a random scan line error, but did contain either a small number of errors defined as the first series (group) or a smaller number of errors defined as the second series (group).

To determine whether or not a received facsimile page is acceptable my arrangement compares the contents of counters 215, 220 and 225 with respective threshold values TH0-TH2 stored in registers 232 through 234, respectively. Briefly referring then to FIG. 3, there is shown TABLE 1 containing illustrative threshold values that are employed for standard resolution and respective transmission rates. For example, TABLE 1 lists values of 20, 2 and 0 which are associated with a transmission rate of 9600 bps and standard resolution. For that operating criteria, then, CPU 20 stores those values into threshold registers 232 through 234, respectively. In the event that the criteria changes as a result of machines 100 and 200 mutually agreeing to decrease their respective transmission rates to, for example, 7200 bps, then CPU 20 stores in registers 232 through 234 the threshold values of 20, 3 and 1, respectively. Thereafter, if the transmission rate is further decreased to, for example, 4800 bps, then CPU 20 loads into registers 232 through 234 the threshold values of 40, 6 and 2, respectively, and so on. It is seen from the FIG. that threshold values TH0 through TH2 increase as the value of the transmission rate decreases. Thus, a change in the transmission rate is less likely to occur at a lower transmission rate, e.g., 4800 bps, than at a higher transmission rate, e.g., 9600 bps.

Figure 3:
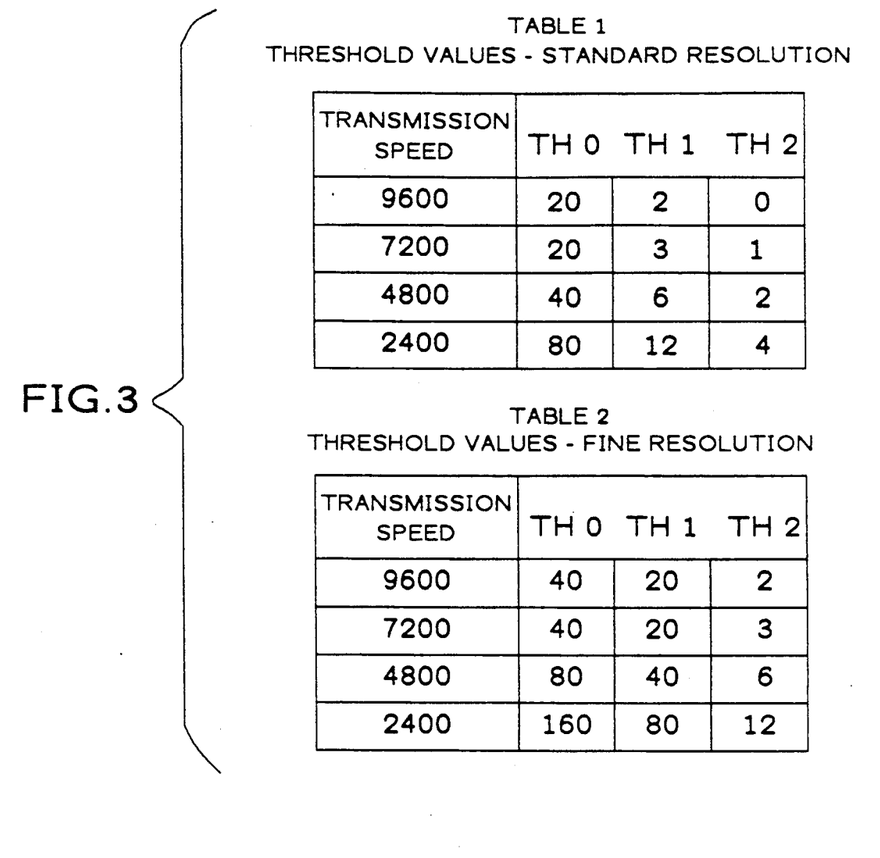
FIG. 3 illustrates in table form various threshold values that are used to gauge the quality of a facsimile page received at a respective transmission rate and resolution.

FIG. 3 also shows TABLE 2 containing illustrative threshold values that are employed for the criteria specifying fine resolution and respective transmission rates. CPU 20 uses TABLE 2 to set the threshold values in registers 232 through 234 similar to the way that CPU 20 uses TABLE 1. Thus, in accordance with the invention, CPU 20 adapts the threshold values in accordance with the current transmission rate and resolution.

Returning to FIG. 2, responsive then to receipt of an EOP signal via lead 14, comparator circuit 230 included in circuit 15 compares the contents of each of the counters 215, 220 and 225 with respective predetermined threshold values that CPU 20 obtained from either TABLE 1 or 2 and then stored in registers 232 through 234. Comparator 230 does this to measure the quality of the current facsimile page that has been received from machine 200. The quality of a received page is deemed to be unacceptable if the contents of any one of the counters 215, 220 or 225 at least equals its respective threshold value. Otherwise, the received page is deemed to be acceptable. In either case, circuit 15 sends to CPU 20 via bus 21 a message indicative of the quality of the received page. CPU 20, in turn, sends to machine 200 either a so-called "message confirmation" signal indicating that the quality of the received page has been found to be acceptable, or a so-called "retrain-negative" signal indicating that the quality of the received page has been found to be unacceptable. Responsive to receipt of the former signal, machine 200 begins the transmission of the next facsimile page, if any.

However, responsive to receipt of a "retrain-negative" signal, machine 200 reverts to a retraining procedure. At that point, machine 200 sends to receiving machine 100 phasing and retraining signals at a fall-back (i.e., reduced) transmission rate, such as, either 7200, 4800 or 2400 bits per second, as the case may be. Receiving machine 100 responsive thereto either confirms or rejects the new transmission rate. Assuming machines 100 and 200 mutually accept the new rate, then machine 200 begins the transmission of a next facsimile page at the accepted rate. Machine 100, responsive to the acceptance of the new transmission rate, for example, a rate of 7200 bps, adapts its fall-back strategy to the accepted transmission rate in the manner discussed above. In an illustrative embodiment of the invention, and as discussed above, CPU 20 does this by accessing either TABLES 1 or 2 based on the current resolution being either standard or fine, respectively, and loading into registers 232 through 234 the respective threshold values associated with the accepted rate.

In the event that the next received facsimile page is found to be unacceptable, then machines 100 and 200 re-negotiate a new transmission rate of, for example, 4800 bps. In that case, then, CPU 20, in accordance with the invention, adapts its fall-back strategy to the new transmission rate by adapting the aforementioned threshold values thereto.

Also included in circuit 15 is overflow (OVFL) lead 206. Counter 205 asserts lead 206 connecting to comparator 230 whenever the contents of counter circuit 205 overflows. The contents of that counter could overflow when, for example, a large number of contiguous scan lines of a received page contain errors. In that event, then, comparator 230 will deem the quality of the received page to be unacceptable and forego comparing the contents of counters 215, 220 and 225 with their respective thresholds as stored in registers 232 through 234 respectively.

Figure 4:
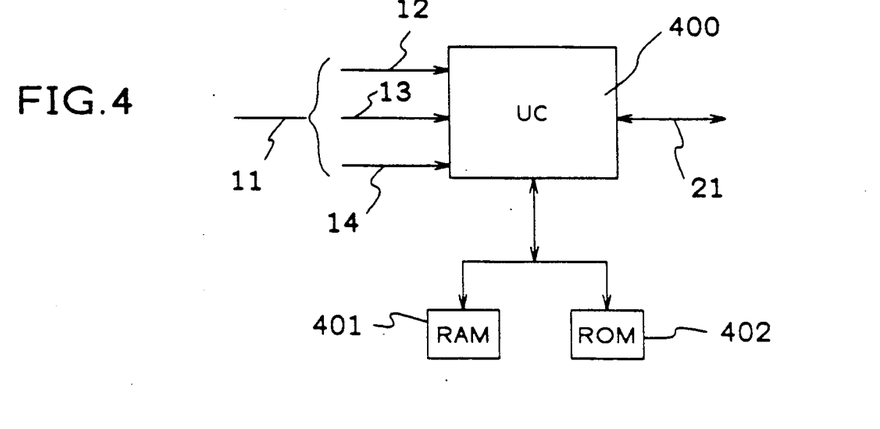
FIG. 4 is a broad block diagram of an alternative arrangement of implementing the invention in the machines of FIG. 1.

Turning now to FIG. 4, there is shown microcomputer 400 and associated RAM 401 and ROM 402 arranged to perform the functions of circuit 15. In particular, counter circuit 205 and counters 215, 220 and 225 as well as registers 232 through 234 may be implemented using a respective number of RAM memory locations. The respective functions performed by comparator 231 and accumulator 210 as well as the other circuit 15 functions may be implemented under software program control stored in ROM 402. The software also controls the overall operation of microcomputer 400.

Figure 5:
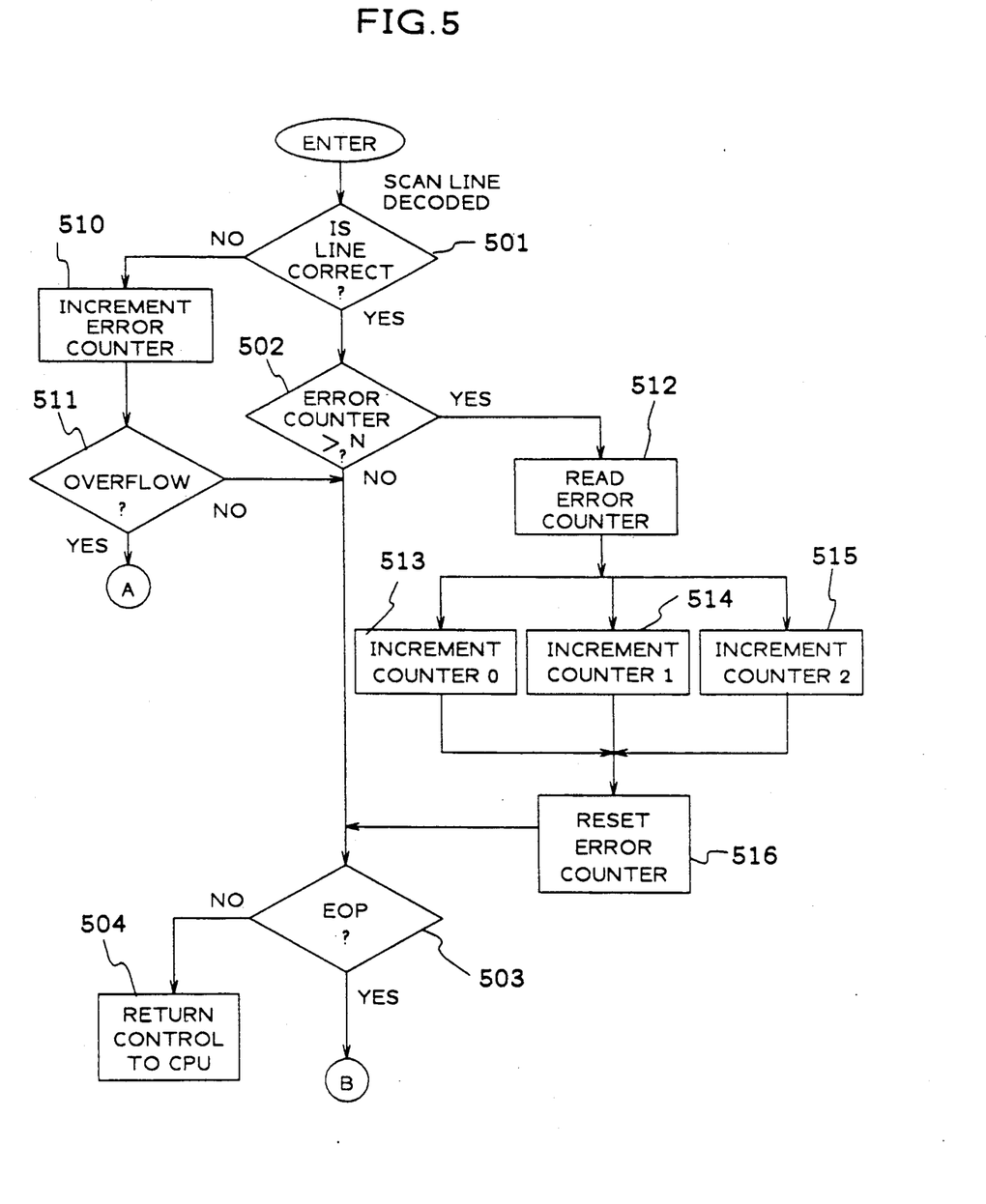
FIGS. 5 and 6 show in flow chart form the program which implements the invention in the machines of FIG. 1.
Figures 6, 7:
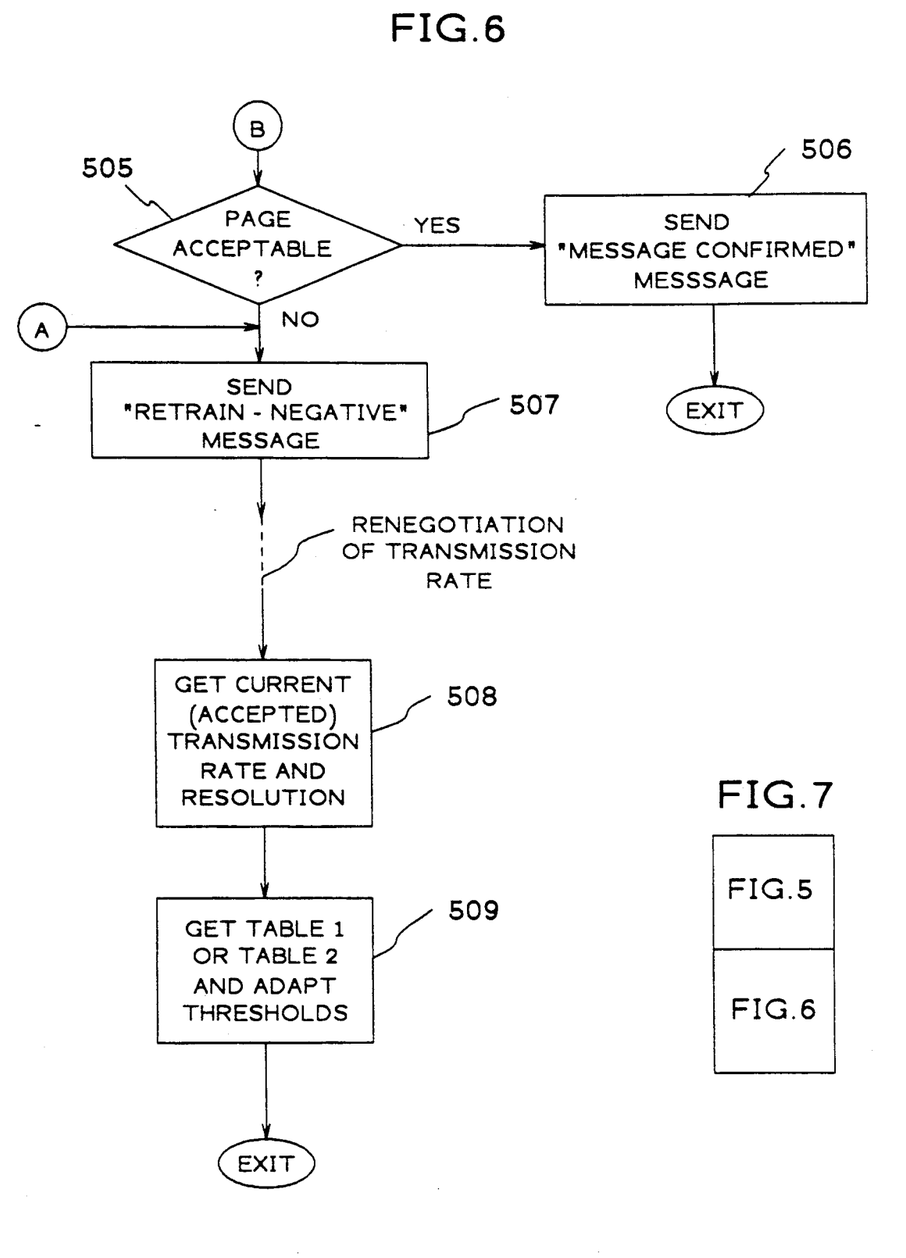
FIG. 7 shows the manner in which FIGS. 5 and 6 should be arranged in relation to one another.

Turning now to FIG. 5, there is shown the program in flow chart form which implements the invention in a facsimile machine, such as, for example, facsimile machine 100.

Specifically, the program is entered via block 500 when decoder 10 has decoded a frame of code words into a respective scan line of pixels. The program proceeds to block 501 where it checks the scan line that has just been decoded to determine if the scan line contains an error. The program proceeds to block 502 if it finds that the scan line does not contain an error. Otherwise, the program proceeds to block 510. At block 502, the program reads the contents of counter 205 to determine if such contents exceeds a predetermined value N, which may be, for example, the value zero.

If the program finds that to be the case, then it proceeds to block 512. Otherwise, it proceeds to block 503. At block block 503, the program checks to see if the associated facsimile machine has received an EOP for the current page. If the program finds that an EOP has not been received, then it proceeds to block 504 where it returns control CPU 20 to prepare for the receipt and decoding of the next scan line. Otherwise, the program proceeds to block 505 where it checks the quality of the received facsimile page. As mentioned above, the program does this by comparing the contents of counters 215, 220 and 225 with their respective threshold values TH0 through TH2 stored in registers 232 through 234, respectively. As mentioned above, if the contents of any one of the counters 215, 220 and 225 exceeds its respective threshold then the quality of the received page is deemed to be unacceptable. Otherwise, the quality is deemed to be acceptable. In the former case, the program proceeds to block 507 and in the latter case, the program proceeds to block 506. At block 506, the program causes its associated facsimile machine to transmit to the transmitting machine the aforementioned "message-confirmed" message. The program then exits.

At block 507, the program causes its associated facsimile machine to transmit to the transmitting machine the aforementioned "retrain-negative" message. As a result of that message, the transmitting and receiving machines enter the aforementioned re-training mode during which time they negotiate a new transmission rate, as represented by the dashed line. When a new (lower) transmission rate has been mutually accepted by the transmitting and receiving machines, then control is returned to the program at block 508. At block 508, the program reads from memory first and second flags respectively indicative of the accepted transmission rate and current resolution. The program then proceeds to block 509 where it adapts threshold TH0 through TH2 to the accepted transmission rate and current resolution. The program then exits.

Turning next to block 510, the program thereat increments error counter 205. The program then proceeds to block 511 to check the value represented by the contents of that counter. If the program finds that that value meets or exceeds a predetermined value—illustratively 14—then it considers counter 205 to be in an overflow state. In that event, then, the program considers the quality of the page to be unacceptable and proceeds to block 507 to reject the page following receipt thereof. Otherwise, the program proceeds to block 503 as a result of finding that counter 205 is not in an overflow state.

Turning now to block 512, the program thereat "reads" the contents of counter 205 and then transfers to one of the blocks 513 through 515 based on the value represented by such contents. That is, the program transfers to (a) block 513 if the value happens to be a one, (b) block 514 if the value happens to be either a two or three, or (c) block 515 is the value happens to be four or more, but less than fourteen. At either one of the blocks 513 through 515, the program increments the respective counter 215, 220 or 225. The program then proceeds to block 516 where it resets (clears) counter 205 so that it may be used to track the quality of the remainder of the incoming facsimile page.

Although a specific embodiment of the invention has been shown and described, it will be understood that various modifications may be made thereto without departing from the spirit and scope of the invention. For example, TABLES 1 and 2 could be replaced by a software algorithm which "calculates" the thresholds in accord with a predetermined algorithm. That is, the threshold values associated with 7200 bps, 4800 bps and 2400 bps could readily be calculated from the threshold values associated with 9600 bps. As a further example, the fall-back strategy disclosed and claimed herein could be arranged so that the error checking strategy is invoked following receipt of some statistically calculated number of facsimile scan lines, such as, for example, the number of lines making up one-half of a facsimile page. In this way, if the quality is deemed to be unacceptable based on the number of errors occurring in the first half of the received page, then the transmission rate could be decreased to reduce the effect of transmission impairments on the second half of the page.

I claim:

1. Apparatus for determining the quality of a facsimile page composed of a plurality of scan lines each received at a predetermined transmission rate, said apparatus comprising means for determining the number of said lines that contain errors, means operative following receipt of a predetermined number of said scan lines for comparing said number with a threshold value associated with said transmission rate and for causing said predetermined transmission rate to be changed to another transmission rate if said number at least equals said threshold, and means responsive to said change for changing the value of said threshold as a function of said other transmission rate.

2. The apparatus set forth in claim 1 wherein said predetermined number is equal to the number of scan lines comprising said facsimile page.

3. The apparatus set forth in claim 1 wherein said scan lines that contain errors includes scan lines randomly dispersed throughout said facsimile page and groups of scans lines in which each of said groups represent a predetermined number of contiguous scan lines each containing an error, wherein said means for comparing includes means for comparing the number of said randomly dispersed scan lines containing errors and the number of said groups with respective thresholds adapted to the transmission rate of said received page and for causing said change if either of said numbers at least equals its respective threshold.

4. The apparatus set forth in claim 3 wherein said groups includes first and second groups of errors, said first group representing an error occurring in each line of two-three contiguous lines and said second group representing an error occurring in each line of at least four contiguous lines, and wherein said first and second group errors being associated with respective threshold values adapted to the transmission rate of said facsimile page.

5. A fall-back strategy arrangement for use in a facsimile machine comprising means for receiving a facsimile page at a predetermined transmission rate, said facsimile page being composed of a plurality of scan lines, means for determining which of said scan lines contain an error and for classifying each such scan line error as a first type when said error occurs in a scan line disposed between scan lines containing no errors, or as either a second or third type when said error occurs in a scan line associated respectively with a first or second group of errors, in which said first and second groups represent respective predetermined numbers of contiguous scan lines each containing an error, and means operative for changing said predetermined transmission rate to another transmission rate if the number of said first, second or third types of errors at least equals a respective threshold value.

6. A fall-back strategy arrangement for use in a facsimile machine comprising means for receiving a facsimile page at a predetermined transmission rate, said facsimile page being composed of a plurality of scan lines, means for determining which of said scan lines contain an error and for classifying each such scan line error as either a first type when said error occurs in a scan line disposed between scan lines containing no errors or a second type when said error occurs in a scan line that is one of a plurality of contiguous scan lines each containing an error, means operative for changing said predetermined transmission rate to another transmission rate if either the number of said first type or the number of said second type of errors at least equals a respective threshold value, and means responsive to said change for changing the threshold value associated with said first type and the threshold value associated with said second type to respective other values associated with said other transmission rate.

7. A fall-back strategy arrangement for use in a facsimile machine comprising means for receiving a facsimile page at a predetermined transmission rate, said facsimile page being composed of a plurality of scan lines, means for determining which of said scan lines contain an error and for classifying each such scan line error as either a first type when said error occurs in a scan line disposed between scan lines containing no errors or a second type when said error occurs in a scan line that is one of a plurality of contiguous scan lines each containing an error, means operative for changing said predetermined transmission rate to another transmission rate if either the number of said first type or the number of said second type of errors at least equals a respective threshold value, wherein said facsimile page is received in accordance with one of a number of different types of resolutions, wherein said means for changing maintains first and second tables of threshold values, and means for selecting said other values from either said first or second tables based on whether said resolution is either a first or second type, respectively.

8. The arrangement set forth in claim 5 wherein said first groups is a group comprising either two or three contiguous scan lines each containing an error and said second group is a group comprising at least four contiguous scan lines each containing an error.

9. A fall-back strategy arrangement for use in a facsimile machine comprising means for receiving a facsimile page at a predetermined transmission rate, said facsimile page being composed of a plurality of scan lines, means for determining which of said scan lines contain an error and for classifying each such scan line error as either a first type when said error occurs in a scan line disposed between scan lines containing no errors or a second type when said error occurs in a scan line that is one of a plurality of contiguous scan lines each containing an error, means operative for changing said predetermined transmission rate to another transmission rate if either the number of said first type or the number of said second type of errors at least equals a respective threshold value, wherein said second type of error includes third and fourth types of errors, said scan line error being classified as said third type when said error occurs in a scan line that is one of either two or three contiguous scan lines each containing an error or as said fourth type when said scan line is one of at least four contiguous scan lines each containing an error, and means responsive to said change for changing the threshold values associated with said first, third and fourth types of errors to respective other values associated with said other transmission rate.

10. A method for determining the quality of a facsimile page being received at a predetermined transmission rate, said page comprising a predetermined number of lines, said method comprising the steps of determining the number of said lines that contain errors, responding to receipt of a signal indicative to the end of said facsimile page by comparing said number with a threshold associated with said transmission rate and causing said transmission rate to be changed to another transmission rate in the event that said number at least equals said threshold, and responding to said change by changing the value of said threshold based on the rate of said other transmission rate.

11. A method of implementing a fall-back strategy in a facsimile machine comprising the steps of receiving a facsimile page at a predetermined transmission rate, said facsimile page comprising a plurality of lines, determining which of said lines contains an error and classifying each such line error as a first type when said error occurs in a line disposed between lines containing no errors, or as either a second or third type when said error occurs in a scan line associated respectively with a first or second group of errors, in which said first and second groups represent respective predetermined numbers of contiguous scan lines each containing an error, and changing said predetermined transmission rate to another transmission rate if the number of said first, second or third types of errors at least equals a respective threshold value.

* * * * *